(12) United States Patent
Bartels

(10) Patent No.: US 6,378,360 B1
(45) Date of Patent: *Apr. 30, 2002

(54) APPARATUS FOR WIRE-FREE TRANSMISSION FROM MOVING PARTS

(75) Inventor: Oliver Bartels, Erding (DE)

(73) Assignee: IQ-Mobil Electronics GmbH, Garmisch—Partenkirchen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,343

(22) Filed: Nov. 25, 1998

Related U.S. Application Data

(63) Continuation of application No. PCT/EP97/02798, filed on May 28, 1997.

(30) Foreign Application Priority Data

May 29, 1996 (DE) .......................... 196 21 354
Nov. 24, 1996 (DE) .......................... 196 48 531
Jan. 27, 1997 (DE) .......................... 197 02 768

(51) Int. Cl.$^7$ .............................. B60C 23/02

(52) U.S. Cl. .................................... 73/146.5

(58) Field of Search .............................. 73/146, 146.4, 73/146.5, 146.8, 714; 340/442, 445, 440, 447; 364/550, 558, 565

(56) References Cited

U.S. PATENT DOCUMENTS 4,174,515 A * 11/1979 Marzolf
5,694,111 A * 12/1997 Huang ........................ 340/442
5,728,933 A * 3/1998 Schultz et al. .............. 73/146.5

FOREIGN PATENT DOCUMENTS

| DE | 29 02 213 | 7/1980 |
|---|---|---|
| DE | 37 29 420 | 3/1989 |
| DE | 44 13 211 | 10/1995 |
| DE | 295 09278 | 1/1996 |
| EP | 0 450 653 | 5/1991 |
| EP | 0 619 906 | 10/1994 |

OTHER PUBLICATIONS

"Remote Sensing Using Quartz Sensors", T. Sachs et al. SPIE–Int. Soc. Opt. Eng. (USA); Smart Structures and Materials 1996, "Smart Sensing, Processing and Instrumentation", San Diego, CA, USA (Feb., 1996) vol. 2718, pp. 47–58.

"Messung mechanischer Grössen mit funkabfragbaren Quarzresonatoren", 40. Intern. Wissenschaftl. Kolloquium, vol. 1, pp. 128–133, Ilmenau 1995. (No Month).

"SAW Devices Passive Sensors", L. Reindl et al., 1996 IEEE Ultrasonics Symposium, pp. 363–367, (No Month).

* cited by examiner

Primary Examiner—William Oen
(74) Attorney, Agent, or Firm—Pepper Hamilton LLP

(57) ABSTRACT

An apparatus for wire-free transmission of at least one measured value, from moving parts, is for measuring the tire pressure in motor vehicles, and includes: a measured value transmitter, in particular a pressure meter in the tire; a measurement system, which includes at least one antenna in the vicinity of the measured value transmitter, as well as at least one electronics assembly, in which case, at least one supply frequency is produced in the measurement system and is emitted to the measured value transmitter and is received from it. Further, the measured value transmitter includes at least one resonator coupled to at least one non-linear electronic component, and the resonator is influenced by the value to be measured. Multiples of the supply frequency or sum or difference frequencies of a plurality of supply frequencies are formed in the non-linear electronic component by mixing or forming harmonics.

15 Claims, 4 Drawing Sheets

APPARATUS FOR WIRE-FREE TRANSMISSION FROM MOVING PARTS

RELATED APPLICATIONS

This Application continuation of PCT Applications No. PCT/EP97/02798 filed May 28, 1997, which in turn claims priority from German Patent Application No. 19621 354.1, filed May 29, 1996, German Patent Application No. 196 48 531.2, filed Nov. 24, 1996 and German Patent Application No. 197 02 768.7 filed Jan. 27, 1997, all of which are incorporated herein by reference.

BACKGROUND OF THE INVENTION

The invention relates to an apparatus for wire-free transmission of the least one measured value from moving parts, as claimed in the preambles of the independent claims 1, 5 and 9. An apparatus of the this generic type and as claimed in claims 1 and 5 has been disclosed in EP 0 201 149 A2. An apparatus of this generic type and as claimed in claim 9 has been disclosed in DE 31 07 947 A1.

The invention is based on the problem of determining the pressure and other measured values from the rotating tire, converting them into an electrical signal and indicating them or, for example, evaluating them for pressure-loss warning messages. The determination of the pressure itself and its conversion into all electronic variable presents no problems whatsoever based on the prior art, and suitable mechanically or capacitively based sensors as well as integrated solutions based on semiconductors have been known for a long time.

The actual problem in the case of the vehicle is represented by the data transmission and the power supply of the pressure sensor since the high and severely fluctuating rotation speed of the tire together with the steering and chassis movements and the severe dirt contamination prevents not only transmission via wires, for example via sliding contacts, but also optical or acoustic transmission.

Systems which operate on an inductive or radio basis are therefore used in high-quality vehicles. To this end, a generator produces a supply frequency which is made available in the vicinity of the tire by means of a coil or antenna. This supply frequency can then be absorbed or amplified by a tuned circuit or other resonator, with the resonator being influenced by a pressure sensor. This influencing of the fundamental frequency can then be measured and evaluated. This is disclosed, for example, in EP-A-0 450 653, which is similar to the method of inductive train protection.

However, in all these methods, the high susceptibility to defects is disadvantageous, resulting in particular from the use of the same frequency for supplying the measured value transmitter and for measurement. In consequence, such attenuations or amplifications of the measurement frequency could also be misinterpreted as the measured value, although they are not caused by the measure value transmitter.

It would thus be obvious to accommodate an active circuit in the measured value transmitter, which is supplied by a supply frequency and responds at a second frequency. Unfortunately, owing to the rapid rotation of the wheel, the supply is, however, ensured over an acceptable time period only if the distance between the measured value transmitter and the supply coil or antenna fluctuates only to a minor extent. This makes it necessary to position the measured value transmitter in the vicinity of the axle, and thus makes it necessary to use a special rim which, for its part, results in high costs.

SUMMARY OF THE INVENTION

The invention is thus based on the object of transmitting the measured value reliably even if the transmission conditions are fluctuating severely, and without a dedicated power supply for the measured value transmitter.

The object is in each case achieved according to the invention by the apparatuses which are specified in the independent patent claims and its functions will be explained in the following text. Advantageous embodiments are described in the dependent claims.

The system according to the first alternative of the invention comprises a measured value transmitter which is located in the tire and does not have its own power supply, as well as a measurement system which is mounted in a fixed position in the vehicle and comprises one or more antennas and one or more electronic assemblies.

The supply frequency is produced by one or more generators and is emitted via an antenna in the vicinity of the tire. This supply frequency is now received by the measured value transmitter, for example via a tuned circuit, and is passed on to a non-linear element, for example a varactor diode. Harmonics are now formed at this element or, if there are a plurality of supply frequencies, their sum and difference frequencies. The measured value transmitter also contains a resonator which is tuned to a suitable harmonic, or sum or difference frequency, and which can be influenced by the measured value. It is now alternatively possible to measure the tire pressure either by varying the resonant frequency by means of a capacitive transmitter or by switching the resonator on or off by means of switches.

The measurement frequency which is thus produced in the measured value transmitter and is emitted can now easily be received using a suitable receiver, without any interference from the supply frequency, and can be evaluated to determine the measured value. The measured value is then made available by the receiver for further evaluation and indication.

The receiver is now no longer influenced by the supply frequency, and the dynamic requirements for its input stage are reduced. This also allows higher measurement and supply frequencies to be used, as a result of which, even at high wheel rotation speeds, a sufficient number of cycles are transmitted for reliable identification or frequency determination of the measurement frequency every time the measured value transmitter moves past the fixed antennas. Furthermore, the transmission range is now increased at the higher frequencies that are now possible.

DETAILED DESCRIPTION OF THE PREFERRED EMBODIMENTS

Figure 1:
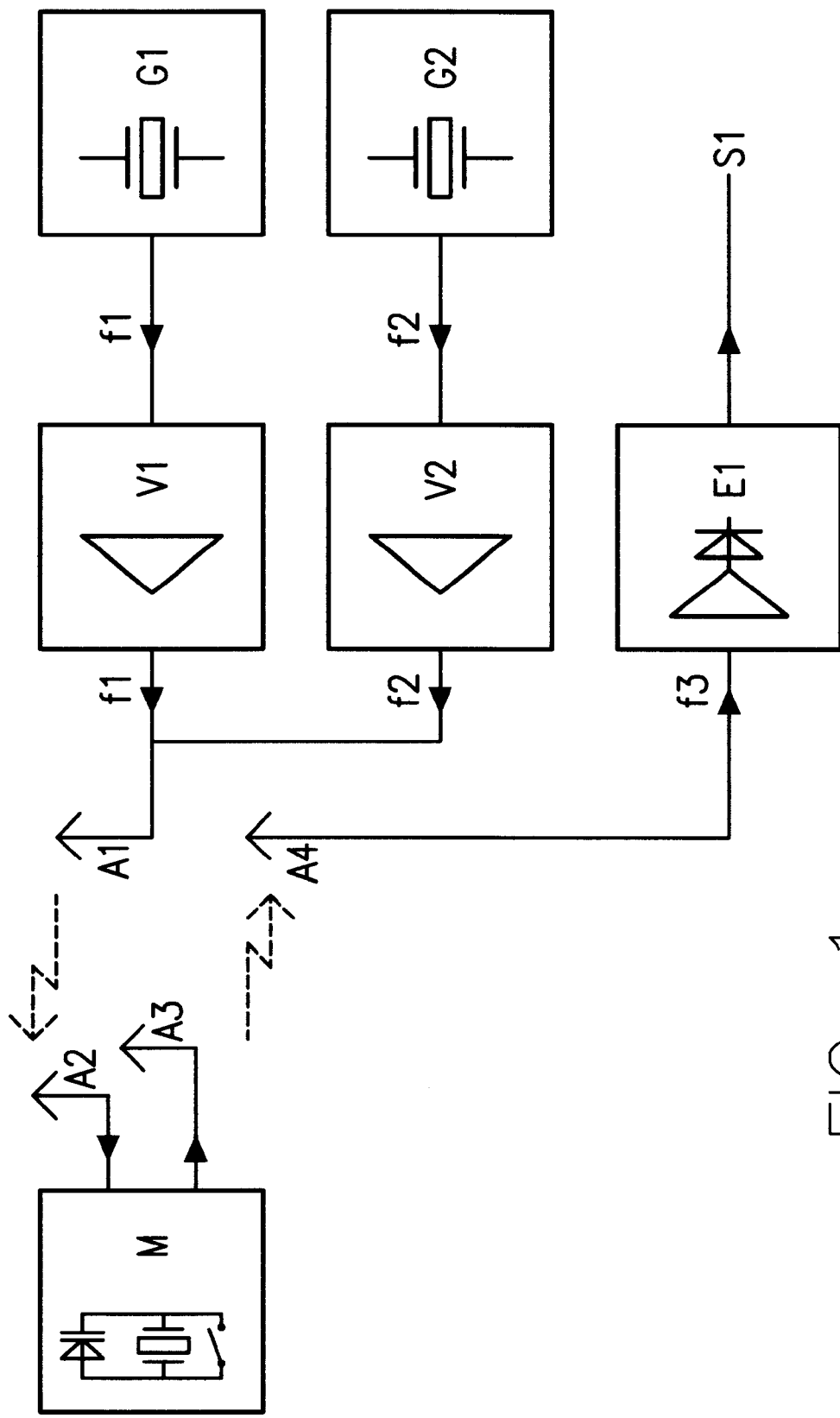
FIG. 1 shows a circuit diagram of the first embodiment of the apparatus of the prevent invention.

An apparatus according to the invention is explained using examples in FIGS. 1 to 5. In FIG. 1, the supply frequencies of f1=2.41 GHz and f2=2.45 GHz are produced by the generators G1 and G2, are amplified by amplifiers V1 and V2, and are passed on via an antenna A1 to the tire.

Figure 2:
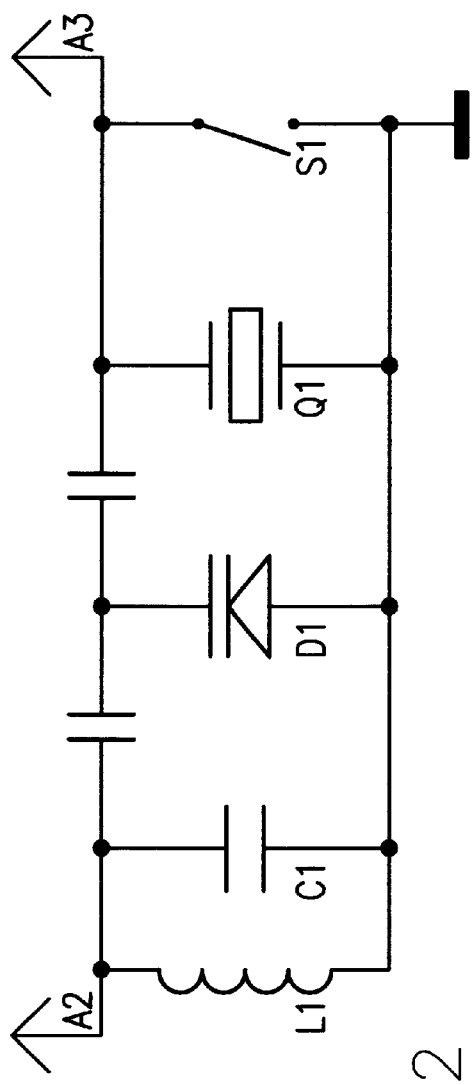
FIG. 2 shows the measured value transmitter of FIG. 1.

The measured value transmitter M for transmitting the sate of a pressure switch is located in the tire. The measured value transmitter M is described in detail in FIG. 2. If the switch S1 in FIG. 2 is closed because the pressure is too low, the transmitter is short-circuited and inoperative. No measurement frequency is therefore emitted. Otherwise, the frequency is received by the antenna A2 with a (stripline) tuned circuit L1/C1 and is supplied to the varactor diode D1. The difference frequency of f3=f2−f1 (=40 MHz) is formed there, is used to excite the crystal Q1, and is then emitted via the antenna A3.

Figure 3:
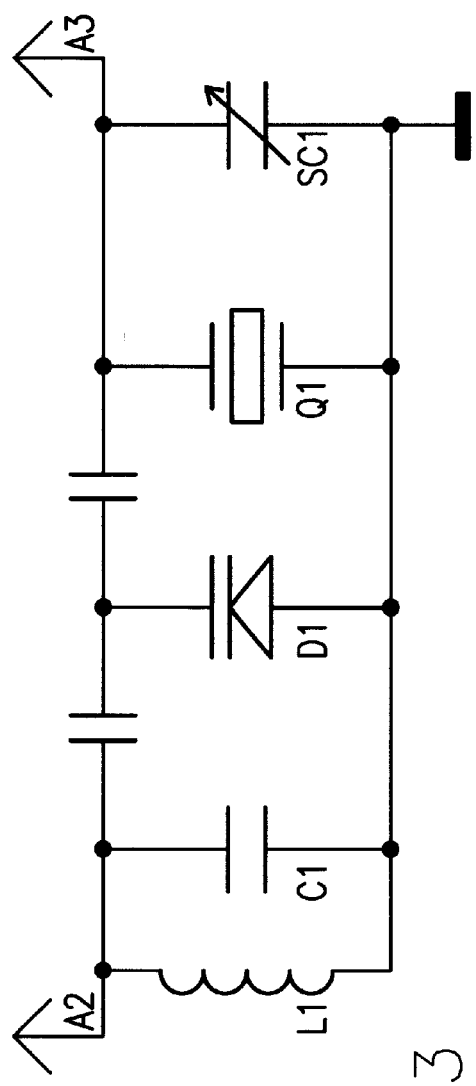
FIG. 3 shows an alternative embodiment of the measured value transmitter of FIG. 1.
Figure 4:
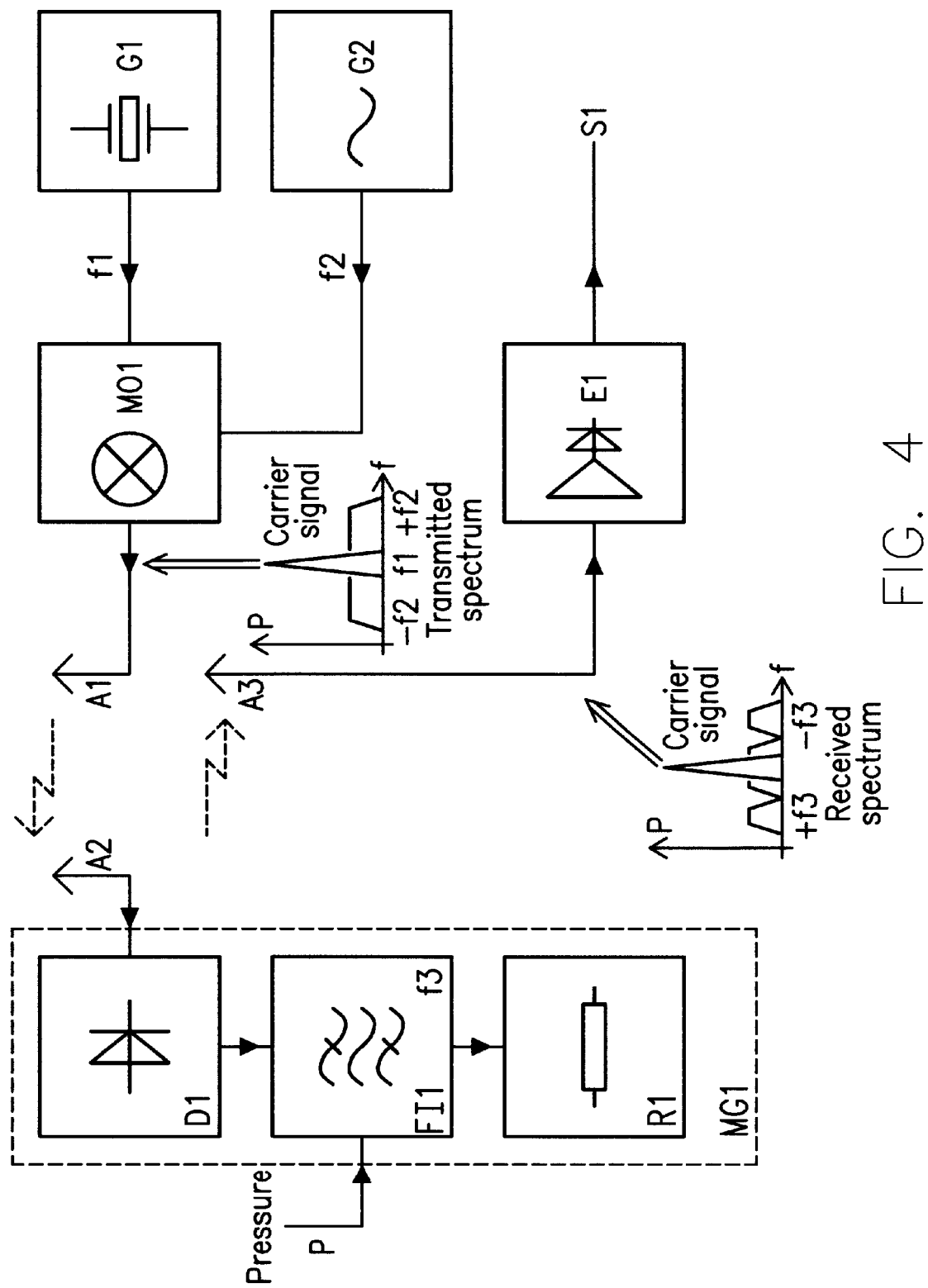
Figure 5:
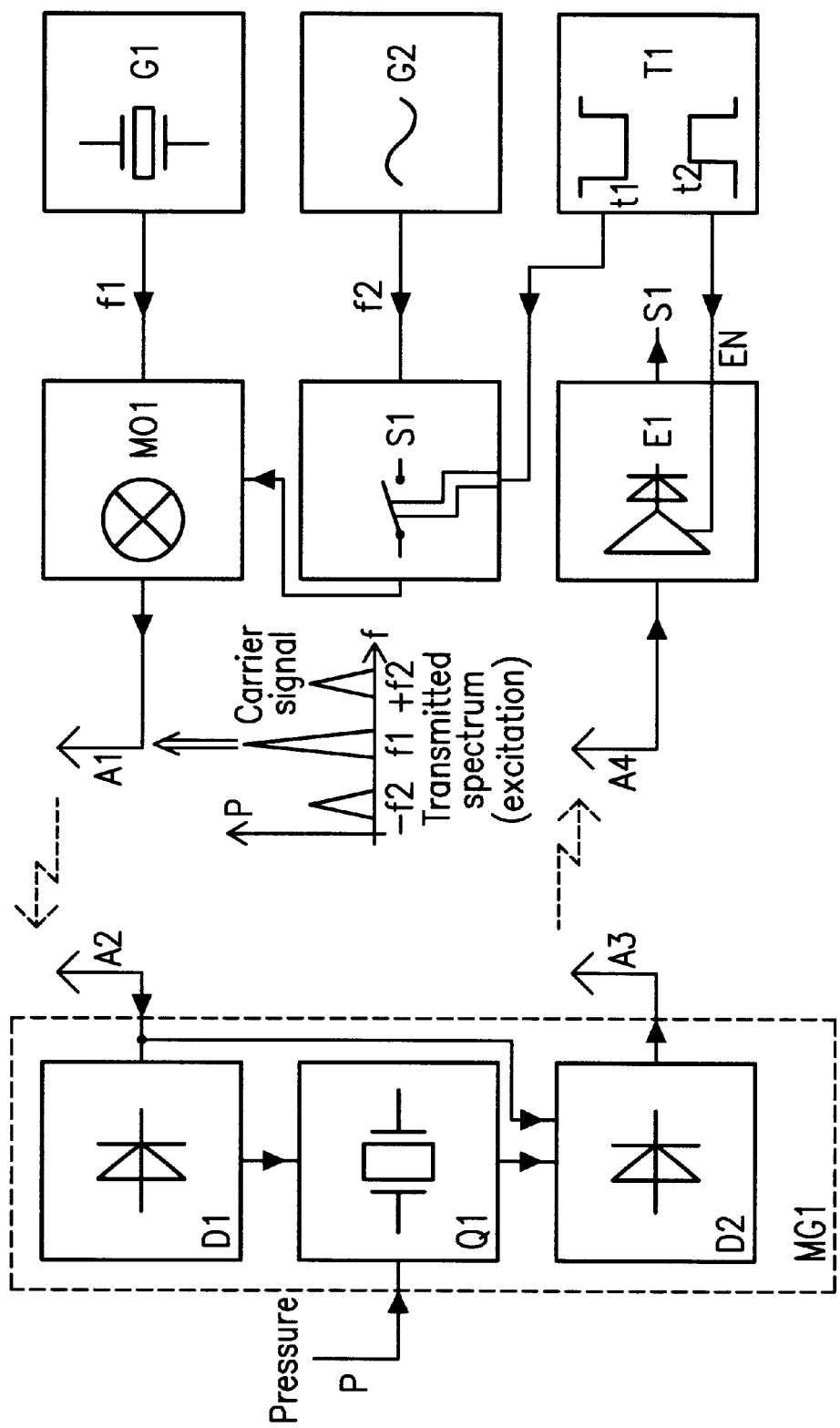

FIG. 3 shows an alternative design for the measured value transmitter M for transmitting continuous measured values. Instead of the short-circuit by the switch S1, the resonant frequency of the crystal Q1 is varied by means of the capacitive pressure sensor SC1.

The measurement frequency f3 emitted by the measured value transmitter M can now be received by the antenna A4 and evaluated by the measurement receiver E1. The measured value is then available as the signal s1.

The use of a varactor diode (capacitance diode) as the non-linear electronic component in the resonator is feasible particularly by virtue of the so-called parametric amplification effect.

In a particularly advantageous embodiment of the invention, the supply frequencies are all produced simultaneously by modulation or mixing of a single basic supply frequency with a suitable modulation signal. In this context, I/Q modulation by means of modulation signals produced digitally by a signal processor is particularly advantageous. In this way, any desired number of supply frequencies can be produced simultaneously without a corresponding number of generators being required. Thus, by suitable calculation of the spectrum, a resonant response at the measurement frequency which is associated with this measured value takes place immediately in each case, for each measured value and with continuous measured value transmission (FIG. 3). There is thus no necessity to slowly vary ("sweep") the supply frequency or frequencies in order to scan the resonance point. The modulation can also be carried out by a filtered pseudo-random signal (noise signal).

It is likewise possible in the receiver to use analog/digital conversion of the received measurement frequency or receiver intermediate frequency and digital demodulation and evaluation by means of DDC (Digital Down Converter) and a signal processor (Fourier analysis). The emitted measurement frequency can thus be determined directly (without any "sweep").

Once the measured value has been determined, the energy in the spectrum can also be concentrated, for example by suitable filtering, at the expected value for the next measured value, in order to improve the measurement accuracy.

For cost reasons, it is also highly advantageous to integrated the measured value transmitter (comprising the (pressure) sensor together with the non-linear electronic component and the resonant element) on a hybrid or integrated circuit, in which case, for example, a surface acoustic wave (SAW) resonator may also be used instead of a tuned circuit or crystal, this resonator being tuned or switched directly by the measured value.

Further options for refinement of the invention are to supply the supply frequency and to receive the measurement frequency via only one (coaxial) cable between the fixed controller and the antennas fitted in the wheel box, and to separate the frequencies by means of high-pass, low-pass or bandpass filters.

Furthermore, another reference resonator can also be accommodated in the measured value transmitter, which always transmits a signal constantly back at a second measurement frequency, irrespective of the measured value. This makes it possible to compensate once again for frequency shifts resulting, for example, from the Doppler effect etc. in the receiver. Other measurement frequencies may be used, for example for transmitting other measured values such as tire temperature or structural stress (forces).

One development is for the modulation signal to be derived from a filtered (pseudo-) random signal, in which case the energy in the resultant spectrum is concentrated at the supply frequencies corresponding to the expected value of the measurement frequency. Provision is also made for the difference frequency between two supply frequencies to be formed in the non-linear electronic component as a new measurement frequency, and for the resonator in the measured value transmitter to be a crystal whose frequency is varied capacitively, or for the resonator in the measured value transmitter to be a surface acoustic wave filter.

The system according to the second alternative of the invention comprises a measured value transmitter which is located in the tire but does not have its own power supply, as well as a measurement system which is mounted in a fixed position in the vehicle and comprises one or more antennas and one or more electronic assemblies which, in their totality, are covered in the following text by the term controller. The advantage of this apparatus is that it can manage with one frequency band. An apparatus for the second alternative according to the invention is shown, using an example, in FIG. 4.

At least one radio-frequency generator G1 for a carrier signal f1 is located in the controller, the carrier signal f1 preferably being in the so-called microwave frequency band around 2.4 GHz, which is modulated by at least one lower-frequency signal f2 produced by the generator G2, preferably in the frequency band from 1 to 30 MHz. The frequency of f2, in particular, can be varied (for example by a microcomputer command)., or a plurality of frequencies f2 (f2.1 or f2.n) are used for modulation simultaneously (e.g. by reverse Fourier transformation or FFT). In this example, the modulation is carried out in the modulator MO1 but can, alternatively, also be carried out directly in the radio-frequency generator (G1). The resultant signal is amplified and is emitted in the vicinity of the tire, via an antenna A1.

The modulation is preferably amplitude or I/Q modulation. According to the equations which apply to such modulation forms, further sidebands are produced in the spectrum to the left and right alongside the carrier frequency, specifically, for example, at f1+f2 and f1−f2 for amplitude modulation. If a plurality of frequencies f2 are used, than their sum results in a sideband spectrum which is illustrated, likewise using an example, in the drawing.

A measured value transmitter MG1 (transponder) is located in the tire, comprising at least one antenna A2, at least one diode D1, preferably a Schottky or detector diode, as well as at least one absorber element, whose frequency is selected in the region of the signal f2, with an absorption maximum at the frequency f2, which absorption maximum is influenced by the tire pressure. This element may be, for example, a crystal or a ceramic filter and the influence preferably varies its resonant frequency f3 or the Q-factor, and thus the amount of absorption. A ceramic filter is expediently terminated by a resistor where the received energy which is intended for absorption is converted into heat. By way of example in the drawing, the absorber element was formed from a filter F11 together with a resistor R1.

A capacitive pressure sensor may be used, for example, to influence the absorber element but it would, of course, also be feasible to disconnect the entire measured value transmitter by means of switches in the event of low pressure or other events to be transmitted. The important factor is that the absorber element has a high impedance at third frequencies. In the example in the drawing, the pressure sensor forms a unit with the filter F11.

A crystal is subjected to tension by this capacitive pressure sensor, thus influencing its resonant frequency.

In the case of a ceramic filter it is possible to vary the terminating resistance or other load resistances or reactances by means of the measured value, by which means the filter characteristic is influenced to a measurable extent.

It is, of course, also possible to use one or more conventional filters, for example composed of L/C tuned circuits or R/C filters in the absorber, which are influenced by resistive, inductive or capacitive sensors.

The measured value transmitter now has a particular influence on the electromagnetic field located in the vicinity of the tire. The modulated supply frequency produced by one or preferably more generators is emitted via an antenna in the vicinity of the tire. This supply frequency is now received by the measured value transmitter and is demodulated by means of the non-linear element, for example by rectification in the diode. This allows the modulation frequency $f2$ to be recovered in the measured value transmitter. If this now corresponds to the resonant frequency $f3$ of the absorption element, it is loaded and its energy is converted, for example, into heat.

In this way, however, energy is selectively removed from the field, to be precise, for example in the case of amplitude modulation, exclusively at those sideband frequencies whose frequency separation from the carrier is about $f3$. If the modulation frequency $f2$ now comes close to the frequency $f3$, the sidebands $f1+f3$ and $f1-f2$ are heavily attenuated. This attenuation can now be measured by the controller, and the tire pressure and other measured values can thus be deduced from it. In contrast, other sideband frequencies and the carrier remain largely uninfluenced by the attenuation.

This distinction from broadband attenuating resulting, for example, from the influence of water makes it possible for the controller to reliably identify the measured value transmitter signal and to compensate for interference, and represents the major advantage of the invention over previous systems. In the drawing, the attenuated spectrum of a plurality of $f2$ frequencies has been indicated by way of example using the receiving antenna A3.

The attenuation is preferably measured by means of a receiver E1 in the controller having an antenna A3 in the vicinity of the tire, although the transmitting antenna can also be used for this purpose. After analysis, for example by demodulation, and conversion in the receiver, the pressure information is then available as the signal s1. The receiver is preferably a superheterodyne receiver (superhet), and a plurality of frequencies can be interrogated successively by varying the frequency of the local oscillator.

It is particularly advantageously in this case to accommodate the first input amplifier stage and/or mixer stage in miniaturized form in the antenna itself, and a mixer can in this case be supplied from the transmitted signal or else with a further frequency in radio-frequency terms (local oscillator signal) and, by means of DC decoupling, also with a supply voltage via a common antenna cable. A major advantage in this case is the frequency separation between the transmitted and received signals, and thus the capability to use only one (coaxial) antenna cable for both signals and for the power supply for the preamplifier and mixer.

Another version of the invention detects the field by means of a receiver which is connected to a directional coupler in the antenna feeder, in which case the directional coupler carries out a separation process in the forward and backward waves, and the level of absorption can be deduced by evaluation of the two signals from the directional coupler.

If modulation is carried out with a plurality of frequencies simultaneously, irrespective of whether this is by reverse Fourier transformation, pseudo-random noise and/or I/Q modulation, the changed electromagnetic power density spectrum can be interrogated, for example by digitizing by means of an A/D converter, and further processing by means of a digital down converter and/or signal processor, simultaneously at a plurality of sideband frequencies. The phase information can be used to evaluate the direction in which the frequency of the absorption element is being drawn, and thus to rapidly determine the mid-frequency (for maximum absorption) $f3$ of the absorption element, with Newton's approximation method preferably being used for this purpose. Furthermore, it is also feasible to use neural networks to evaluate the frequency spectrum. Time-controlled weighting networks are advantageous for this purpose, as described in Patent DE 4105669 by the same inventor.

The carrier frequency $f1$ should be produced by means of a stable oscillator having a low phase noise level. PLL control of the frequency $f1$ makes it possible to specifically compensate for interference and frequencies occupied by other users, for example other vehicles, as found by means of a microcomputer command, without this resulting in contact with the measured value transmitter being lost since, with regard to the measured value transmitter, when changes that are not excessively large occur in $f1$, all that matters is the modulation. The receiver must, of course, likewise be appropriately retuned. This capability to change frequency in the case of interference represents a further major advantage of the invention.

The interference can be identified using the same receiver E1 as that which also carries out the attenuation evaluation. Furthermore, identical systems can use deliberate modulation to provide one another with additional information about frequency occupancy, as well as to exchange other information with one another. For example, joint use of the assemblies with or without an additional antenna would be feasible, to provide mutual warnings of collision between vehicles.

The modulation frequency or frequencies $f2$ is or are expediently produced by means of a D/A converter by direct digital synthesis. Very pure frequencies can be produced by means of a so-called phase accumulator with a downstream sine/cosine table. In this case, the signal width in the spectrum can be varied as required, possibly also by means of a microcomputer command, by means of filtered pseudorandom phase changes.

In a further advantageous embodiment of the invention, the identification of the sideband absorption maximum is carried out by means of a digital phase locked loop with digital filters, and using the filter result to vary the phase increment of the phase accumulator for the direct digital synthesis.

Theoretically, it is also possible to use angle modulation (phase or frequency modulation) to modulate $f2$ on to the signal $f1$ since, once again, sideband frequencies occur at $n\times(f1+f2)$ and $n\times(f1-f2)$, but their intensity is governed, inter alia, by complex Bessel functions, and the influence of the absorption is thus more difficult to determine. In contrast, the measurement uncertainty could be further improved by using a passive FM detector in the measured value transmitter, for example a ratio detector.

In order to supply other active components in the measured value transmitter, a portion of the carrier signal can also be converted by rectification into a DC voltage and, likewise, the attenuation can also be evaluated by loading the carrier.

Overall, the system is preferably controlled via a microcomputer or signal processor, which can also carry out the further processing, conversion and evaluation of the measured values.

For cost reasons, it is also highly advantageous to integrate the measured value transmitter (comprising the (pressure) sensor together with the non-linear electronic component and the resonant element) on a hybrid or integrated circuit, in which case a surface acoustic wave (SAW) resonator or integrated L/C tuned circuits, for example, can also be used instead of a ceramic filter or crystal, and can be tuned or switched directly by the measured value.

Furthermore, another reference absorption element can also be accommodated in the measured value transmitter, which, independently of the measured value, always absorbs a signal constantly at a sideband frequency which is independent of the measurement frequency f3. This makes it possible to compensate once again for frequency shifts caused, for example, by the Doppler effect etc. in the receiver. Other measurement frequencies f2 may be used, for example, for transmitting other measured values such as tire temperature or structural stress (forces).

One development consists in that the absorption maximum of the absorber in the measured value transmitter is determined by means of a (preferably digital) phase locked loop comprising a (preferably digital) phase comparator, a (preferably digital) filter and a variable-frequency oscillator (VCO), preferably in the form of a digital phase accumulator, whose increment is controlled by the filter output value.

It is advantageous for the absorption maximum of the absorber in the measured value transmitter to be determined by a discrete modulation signal (which, if required, is propagated synthetically, in particular by pseudo-random noise), by means of successive approximation, in particular Newton's approximation.

It is furthermore envisaged that the non-linear electronic component in the measured value transmitter is a Schottky diode or detector diode.

It is also preferable for the absorber in the measured value transmitter to be a crystal, a ceramic filter or a tuned-circuit filter with a terminating resistance, in which case the filter frequency is varied inductively, capacitively or by loading, in each case irrespective of the measured value, and for a first amplification stage and/or frequency conversion of the measurement signal, which results from measuring the electromagnetic field, to be carried out in the antenna assembly itself, as a result of which it is possible to save a second cable for the measurement signal.

The apparatus according to the third alternative of the invention takes account, in particular, of the problem that mixing products can likewise be formed by the nature of the receiver and by the shielding (which can be achieved only with difficulty) of the supply signals in the input stage of the receiver, which mixing products can interfere with reception of the measurement signal and can be separated from it only with difficulty.

The system according to the third alternative of the invention comprises a measured value transmitter which is located in the tire but does not have its own power supply, as well as a measurement system which is mounted in a fixed position in the vehicle and comprises one or more antennas and one or more electronic assemblies which, in their totality, are covered in the following text by the term controller. This system is explained, by way of example, in conjunction with FIG. 5.

The controller contains at least one radio-frequency generator G1 for a carrier signal f1, preferably in the so-called microwave frequency band around 2.4 GHz, which is modulated by at least one lower-frequency signal f2, produced by the generator G2, preferably in the frequency band from 1 to 30 MHz. This modulation results in the required supply frequencies being produced. The resultant signal is amplified and is emitted via an antenna A1 in the vicinity of the tire.

The modulation is preferably amplitude or I/Q modulation. According to the equations which apply to such modulation forms, further sidebands are produced in the spectrum to the left and right alongside the carrier frequency, specifically, for example, at f1+f2 and f1−f2 for amplitude modulation. If a plurality of frequencies f2 are used, than their sum results in a sideband spectrum which is illustrated, likewise using an example, in the drawing.

The modulation can be switched off by the electronic switch S1, which switch is controlled cyclically by a timer T1.

The tire contains at least one measured value transmitter MG1 (transponder), comprising at least one antenna A2, a receiver with at least one diode D1, preferably a Schottky or detector diode, as well as a crystal resonator Q1 which is excited by the received modulation signal. This crystal resonator is now itself once again coupled to a modulator diode or mixer diode D2, preferably a varactor diode in order to allow parametric gain to be used. Furthermore, its frequency is varied (drawn) by the measured value.

The modulation is now switched off by the switch S1 at the time t1, and the receiver E1 is activated shortly after this at a time t2 (EN enable input), with t2 following about 1 $\mu$s (microsecond) after t1.

If the modulation of the supply frequency is now switched off, then the crystal Q1 still continues to oscillate for about 1 ms and, since the carrier is still present, this supply frequency is modulated via the modulator diode D2. However, this occurs only once the modulation frequency f2 has already excited the crystal Q1, that is to say when the modulation frequency corresponds roughly to the possible measured value. The receiver now sees a modulated signal of A3 at its antenna A4 without the supply signal being modulated by A1, which could cause interference, and can thus deduce the measured value from the modulation. In the absence of modulation or if the modulation is too weak, further possible measured values can be sampled iteratively (for example by successive approximation or Newton's iteration), and, if there is no modulation whatsoever, this indicates a defect in the measured value transmitter, which can be signalled to the user.

Other resonators which ring for a long time, for example SAW, Piezo- or tuning-fork resonators, can, of course, also be used instead of the crystal. Theoretically, even an undamped tuned circuit would be conceivable, but in practice this would be unrealistic owing to the unavoidable damping.

Furthermore, instead of interrogation by means of modulation, interrogation in baseband without a modulator and demodulator in the measured value transmitter is also feasible, in which case, however, a microwave frequency with modulation may be used, on the basis of the generally available frequencies.

In this case, it is particularly advantageous to accommodate the first input amplifier stage and/or mixer stage in miniaturized form in the antenna itself. A mixer can in this case be supplied from the unmodulated transmitted signal (direct conversion to baseball) remaining after t1, or else with a further frequency in the radio frequency band (local oscillator signal), as well as with supply voltage via a common cable, by means of DC decoupling. A major advantage in this case is the frequency separation between the transmitted and received signals, and thus the capability to use only one (coaxial) antenna cable for both signals and for the power supply for the preamplifier and mixer.

Such an arrangement is particularly advantageous in conjunction with direction planar antennas since, in this way, directional transmission to and reception from the measured value transmitter are possible without separating the two signal paths.

If modulation is carried out simultaneously at a plurality of frequencies, irrespective of whether this be by reverse Fourier transformation, pseudo-random noise and/or I/Q modulation, the crystal or other resonator is always excited, irrespective of the measurement signal.

In addition, the ringing response signal can be interrogated simultaneously at a plurality of frequencies, for example by digitization by means of an A/D converter, and further processing by means of a digital down converter and/or signal processor. Since, in the ringing phase after t1, the frequency is not influenced by the excitation from the supply frequency modulation, the measured value can thus be determined precisely. A combination of filtering and frequency measurement by determining the period duration or using fast Fourier transformation is advantageous here. It may also be advantageous to evaluate the phase information available in this case in addition to the frequency information in order to define the energy maximum in the supply signal (for change trend identification) for the next measurement.

The carrier frequency f1 should be produced by means of a stable oscillator having a low phase noise level. PLL control of the frequency f1 makes it possible to specifically compensate for interference and frequencies occupied by other users, for example other vehicles, as found by means of a microcomputer command, without this resulting in contact with the measured value transmitter being lost since, with regard to the measured value transmitter, when changes that are not excessively large occur in f1, all that matters is the modulation. The receiver must, of course, likewise be appropriately retuned. This capability to change frequency in the case of interference represents a further major advantage of the invention.

The modulation frequency or frequencies f2 is or are expediently produced by means of a D/A converter by direct digital synthesis. Very pure frequencies can be produced by means of a so-called phase accumulator with a downstream sine/cosine table. In this case, the signal width in the spectrum can be varied as required, possibly also by means of a microcomputer command, by means of filtered pseudo-random phase changes. The times t1 and t2 are expediently predetermined by means of a processor-controlled timer, either by software or as a hardware timer. It is particularly advantageous in this case to synchronize to the tire rotation both times and the time of switching on again for renewed excitation. In this way, the measured value transmitter is excited at a time at which it is located particularly close to the antenna of the measurement system.

The system is preferably entirely controlled via a microcomputer or signal processor, which can also carry out the further processing, conversion and evaluation of the measured values. The microcomputer can also carry out suitable staggering of the excitation if there are a number of resonators and/or measured value transmitters, an optimal timing is achieved by starting the excitation of a further resonator even during the measurement time after t2, or even t1, of the previous resonator, at another excitation frequency.

For cost reasons, it is also highly advantageous to integrate the measured value transmitter (comprising the (pressure) sensor together with the non-linear electronic component and the resonant element) on a hybrid or integrated circuit.

Furthermore, another reference crystal or some other resonator can also be accommodated in the measured value transmitter and which, irrespective of the measured value, always reacts in a constant manner to another frequency, irrespective of the measurement frequency. This makes it possible to compensate once again for frequency shifts caused, for example, by the Doppler effect etc. in the receiver. Other measurement frequencies f2 may be used, for example, for transmitting other measured values such as tire temperature or structural stress (forces).

By using relays or electronics to switch over between a plurality of antennas connected to an electronic unit, the same electronic unit can, of course, be used in conjunction with a multiplexing method for measurement on different tires, or even on the spare wheel.

The invention is, of course, not limited to measurement of the tire pressure, but can be used in a general form for reliably determining measured values in the area of fast-moving parts.

It is a preferred embodiment of the invention that the resonator is a crystal whose frequency is varied (drawn) by means of a capacitive or inductive sensor, or mechanically by loading or temperature changing. It is furthermore envisaged that, once the excitation has been switched off, the frequency of the ringing is determined by filtering and period-duration measurement, if required after the necessary demodulation, and that the measured value is derived from this by conversion.

The invention is developed in that, once the measured value transmitter has been excited, the modulation from the supplying measurement system is switched off, and further modulation of the remaining unmodulated supply frequency is thus caused exclusively by the measured value transmitter, which frequency can thus be measured without any interference from the supplying modulation.

Another embodiment of the invention consists in that the supply frequency which remains after excitation and after the supply frequency has itself been switched off is at the same time used for mixing in the receiver of the measurement system, whose first stages preferably form a physical unit with the antenna.

In addition, it is preferable for the radiation striking the measured value transmitter, and the radiation back from it, to be made directional by using directional antennas, in particular planar antennas, and for the excitation of the measured value transmitter to be switched on and off cyclically, controlled by a timer which is synchronized to the wheel rotation.

What is claimed is:

1. An apparatus for wire-free transmission of at least one measure value from moving parts, including measuring tire pressure in motor vehicles, comprising:

a measured value transmitter, including a value meter in one of the moving parts; and a measurement system comprising at least one antenna in a vicinity of the measured value transmitter, a receiver and at least one electronics assembly, wherein at least one modulated supply frequency is produced in the measurement system and is emitted for reception by the measured value transmitter;

wherein the measure value transmitter has at least one ringing resonator, and one of the frequency characteristics and absorption characteristic of the resonator is influenced by the value to be measured;

wherein the resonator is excited by reception of the modulated supply frequency in the measured value transmitter when the modulation frequency of the modulated supply frequency corresponds to the resonator frequency for indirect modulated excitation;

wherein, once excitation has taken place, the modulation of the frequency is one of switched off and is varied such that excitation of the resonator no longer takes place;

wherein the resonator resonates after excitation and, at the same time, this resonating is modulated by the value to be measured;

wherein the supply frequency is modulated by this modulated resonating and this modulated supply frequency is entitled by the measured value transmitter;

wherein a receiver which is present in the measurement system detects the resonating and users the resonating to derive the measured value by frequency analysis and conversion; and wherein the supply frequencies (f1, f2) are produced by modulation of a common basic supply frequency with a suitable modulation signal.

2. An apparatus for wire-free transmission of at least one measure value from moving parts, including measuring tire pressure in motor vehicles, comprising:

a measured value transmitter, including a value meter in one of the moving parts; and a measurement system comprising at least one antenna in a vicinity of the measured value transmitter, a receiver and at least one electronics assembly, wherein at least one modulated supply frequency is produced in the measurement system and is emitted for reception by the measured value transmitters;

wherein the measure value transmitter has at least one ringing resonator, and one of the frequency characteristics and absorption characteristic of the resonator is influenced by the value to be measured;

wherein the resonator is excited by reception of the modulated supply frequency in the measured value transmitter when the modulation frequency of the modulated supply frequency corresponds to the resonator frequency for indirect modulated excitation;

wherein, once excitation has taken place, the modulation of the frequency is one of switched off and is varied such that excitation of the resonator no longer takes place;

wherein the resonator resonates after excitation and, at the same time, this resonating is modulated by the value to be measured;

wherein the supply frequency is modulated by this modulated resonating and this modulated supply frequency is emitted by the measured value transmitter;

wherein a receiver which is present in the measurement system detects the resonating and uses the resonating to derive the measured value by frequency analysis and conversion; and wherein reception and evaluation of a plurality of measurement frequencies (f3) carried out simultaneously by analog/digital conversion and subsequent digital signal processing.

3. An apparatus for wire-free transmission of at least one measure value from moving parts, including measuring tire pressure in motor vehicles, comprising:

a measured value transmitter, including a value meter in one of the moving parts; and a measurement system comprising at least one antenna in a vicinity of the measured value transmitter, a receiver and at least one electronics assembly, wherein at least one modulated supply frequency is produced in the measurement system and is emitted for reception by the measured value transmitter;

wherein the measure value transmitter has at least one ringing resonator, and one of the frequency characteristics and absorption characteristic of the resonator is influenced by the value to be measured;

wherein the resonator is excited by reception of the modulated supply frequency in the measured value transmitter when the modulation frequency of the modulated supply frequency corresponds to the resonator frequency for indirect modulated excitation;

wherein, once excitation has taken place, the modulation of the frequency is one of switched off and is varied such that excitation of the resonator no longer takes place;

wherein the resonator resonates after excitation and, at the same time, this resonating is modulated by the value to be measured;

wherein the supply frequency is modulated by this modulated resonating and this modulated supply frequency is emitted by the measured value transmitter;

wherein a receiver which is present in the measurement system detects the resonating and uses the resonating to device the measured value by frequency analysis and conversion; and wherein a plurality of measurement frequencies (f3) are used for transmitting further one of measured values and reference values.

4. An apparatus for wire-free transmission of at least one measured value from moving parts, including measuring tire pressure in motor vehicles, comprising:

a measured value transmitter (MG1), including a value meter, in one of the moving parts, and a measurement system whose position is fixed relative thereto and which, for its part, comprises at least one antenna (A1) in a vicinity of the measured value transmitter (MG1) as well as least one electronics assembly;

in which case the measurement system produces a supply frequency, emits this to the measured value transmitter (MG1), and said measured value transmitter (MG1) receives (A2) the supply frequency;

wherein the supply frequency is formed by modulation of at least two carrier signals (f1, f2);

wherein the measured value transmitter (MG1) comprises at least one absorber (FI1, R1) which operates as a function of frequency and is coupled to at least one non-linear electronic component (D1);

wherein one of a frequency characteristic and absorption characteristic of the absorber (FI1, R1) is influenced by the value to be measured;

wherein at leas tone (f2) of the carrier signals (F1, f2) is recovered by demodulating or mixing in the non-linear electronic component (D1) of the measured value transmitter (MG1);

wherein this recovered carrier signal (f2) is supplied to the absorber (FI1, R1), which attenuates the recovered carried signal (f2) as a function of the measured value;

wherein the evaluation of this attenuation is carried out by one of measuring the electromagnetic field by means of a receiver (E1) and by monitoring one of the forward and backward and standing waves in a supply line in the measurement system; and wherein this determined attenuation is available as measured value information (S1) for further use.

5. The apparatus as claimed in claim 4, wherein the modulation is one of amplitude modulation and amplitude modulation which is mixed with phase modulation and frequency modulation, which is I/Q modulation.

6. The apparatus as claimed in claim 4, wherein the reception and evaluation of a plurality of frequencies is carried out simultaneously in the analog signal originating from the measurement of the electromagnetic field and subsequent digital signal processing, including processing by one of Fourier analysis and by digital mixing and subsequent low-pass filtering (Digital Down Converter).

7. The apparatus as claimed in claim 4, wherein production and emission of one or more modulation frequencies simultaneously is carried out by digital/analog conversion of a digital data stream, which is formed by one of direct digital synthesis by means of a phase accumulator and by reverse Fourier transformation.

8. An apparatus for wire-free transmission of at least one measured value from moving parts, including measuring tire pressure in motor vehicles, comprising:

a measured value transmitter (MG1), including a value meter, in one of the moving parts; and a measurement system whose position is fixed relative thereto and which, for its part, comprises at least one antenna (A1) in a vicinity of the measured value transmitter (MG1) as well as at least one electronic assembly;

in which case the measurement system produces at least one supply frequency, emits this to the measured value transmitter (MG1), and said measured value transmitter (MG1) receives the supply frequency;

in which case the measured value transmitter (MG1) has at least one ringing resonator (Q1) whose one of frequency characteristic and absorption characteristic is influenced by the value to be measured; and in which case a receiver (E1) which is present in the measurement system detects the ringing of the resonator (Q1) and uses this to derive the measured value by frequency analysis and conversion;

wherein the supply frequency is modulated by means of at least one modulation frequency (f2);

wherein the resonator (Q1) is excited by reception of the supply frequency if the modulation frequency (f2) of the supply frequency corresponds (indirect modulated excitation) to the resonator frequency;

wherein, once excitation of the resonator (Q1) has taken place, the measurement system one of regularly switches the modulation of the supply frequency off and varies the modulation such that excitation no longer takes place; and wherein the resonator (Q1) rings after this and, at the same time, this ringing is emitted again one of directly and indirectly by modulation with the measured value (P).

9. The apparatus as claimed in claim 8, wherein the supply signal is amplitude-modulated for indirect modulated excitation, and this modulation is demodulated by a non-linear component (D1), in particular a detector diode, in the measured value transmitter (MG1), and is used for excitation of the resonator (Q1).

10. The apparatus as claimed in claim 8, wherein a non-linear component (D2) in the measured value transmitter (MG1), in particular a varactor diode with parametric gain, mixes the ringing of the resonator (Q1) with a supply frequency which remains after the excitation has been switched off and emits a supply frequency, which is modulated with the measured value, as a measurement frequency by the measured value transmitter (MGl).

11. An apparatus for wire-free transmission of at least one measure value from moving parts, including measuring tire pressure in motor vehicles, comprising:

a measured value transmitter, including a value meter in one of the moving parts; and a measurement system comprising at least one antenna in a vicinity of the measured value transmitter, a receiver and at least one electronics assembly, wherein at least one modulated supply frequency is produced in the measurement system and is emitted for reception by the measured value transmitter;

wherein the measure value transmitter has at least one ringing resonator, and one of the frequency characteristics and absorption characteristic of the resonator is influenced by the value to be measured;

wherein the resonator is excited by reception of the modulated supply frequency in the measured value transmitter when the modulation frequency of the modulated supply frequency corresponds to the resonator frequency for indirect modulated excitation;

wherein, once excitation has taken place, the modulation of the frequency is one of switched off and is varied such that excitation of the resonator no longer takes place;

wherein the resonator resonates after excitation and, at the same time, this resonating is modulated by the value to be measured;

wherein the supply frequency is modulated by this modulated resonating and this modulated supply frequency is emitted by the measured value transmitter;

wherein a receiver which is present in the measurement system detects the resonating and uses the resonating to derive the measured value by frequency analysis and conversion; and wherein the function of the electronic assemblies in the respective measurement system, are not provided by electronic components but at least partially by means of a computer program (software).

12. An apparatus for wire-free transmission of at least one measure value from moving parts, including measuring tire pressure in motor vehicles, comprising:
- a measured value transmitter, including a pressure meter in the tire; and
- a measurement system comprising at least one antenna in a vicinity of the measured value transmitter, a receiver and at least one electronics assembly, wherein at least one modulated supply frequency is produced in the measurement system and is emitted for reception by the measured value transmitter;
- wherein the measure value transmitter has at least one ringing resonator, and one of the frequency characteristics and absorption characteristic of the resonator is influenced by the value to be measured;
- wherein the resonator is excited by reception of the modulated supply frequency in the measured value transmitter when the modulation frequency of the modulated supply frequency corresponds to the resonator frequency for indirect modulated excitation;
- wherein, once excitation has taken place, the modulation of the frequency is one of periodically switched off and is varied such that excitation of the resonator no longer takes place;
- wherein the resonator resonates after excitation and, at the same time, this resonating is modulated by the value to be measured;
- wherein the supply frequency is modulated by this modulated resonating and this modulated supply frequency is emitted by the measured value transmitter;
- wherein a receiver which is present in the measurement system detects the resonating and uses the resonating to derive the measured value by frequency analysis and conversion.

13. An apparatus for wire-free transmission of at least one measure value from moving parts, including measuring tire present in motor vehicles, comprising:
- a measured value transmitter, including a value meter in one of the moving parts; and
- a measurement system comprising at least one antenna in a vicinity of the measured value transmitter, a receiver and at least one electronics assembly, wherein at least one modulated supply frequency is produced in the measurement system and is emitted for reception by the measured value transmitter;
- wherein the measure value transmitter has at least one ringing resonator, and one of the frequency characteristics and adsorption characteristic of the resonator is influenced by the value to be measured;
- wherein the resonator is excited by reception of the modulated supply frequency in the measured value transmitter when the modulation frequency of the modulated supply frequency corresponds to the resonator frequency for indirect modulated excitation;
- wherein, once excitation has taken place, the modulation of the frequency is one of switched off and is varied such that excitation of the resonator no longer takes place;
- wherein the resonator resonates after excitation and, at the same time, this resonating is modulated by the value to be measured;
- wherein the supply frequency is modulated by this modulated resonating and this modulated supply frequency is emitted by the measured value transmitter; and
- wherein a receiver which is present in the measurement system detects the resonating and uses the resonating to derive the measured value by frequency analysis and conversion.

14. The apparatus as claimed in claim 13, wherein the value meter is a pressure meter and the moving part is a tire.

15. The apparatus as claimed in claim 13, wherein the modulation of the frequency is periodically switched off.

* * * * *